United States Patent
Moon

(10) Patent No.: US 6,879,117 B2
(45) Date of Patent: Apr. 12, 2005

(54) ELECTRONIC BALLAST FOR FLUORESCENT LAMP

(76) Inventor: Dai Sung Moon, 105-601 Donga 1-cha, Sindorim-dong, Guro-gu, Seoul (KR)

( * ) Notice: Subject to any disclaimer, the term of this patent is extended or adjusted under 35 U.S.C. 154(b) by 0 days.

(21) Appl. No.: 10/602,722

(22) Filed: Jun. 25, 2003

(65) Prior Publication Data
US 2004/0124783 A1 Jul. 1, 2004

(30) Foreign Application Priority Data
Dec. 30, 2002 (KR) .................. 20-2002-0038986

(51) Int. Cl.[7] ................................. G05F 1/00
(52) U.S. Cl. .............. 315/294; 315/247; 315/277; 315/209 R; 315/DIG. 7
(58) Field of Search .............. 315/247, 209 R, 315/291, 294, 312, 324, 277, DIG. 5, DIG. 7, 58, 61, 71, 307

(56) References Cited

U.S. PATENT DOCUMENTS

| | | | |
|---|---|---|---|
| 5,506,474 A | * 4/1996 | Hammer et al. | ........... 315/56 |
| 5,608,295 A | 3/1997 | Moisin | |
| 5,691,598 A | * 11/1997 | Belle et al. | ........... 313/493 |
| 6,091,206 A | 7/2000 | Siao | |
| 6,316,883 B1 | * 11/2001 | Cho et al. | ........... 315/247 |
| 6,348,769 B1 | 2/2002 | Pinchuk et al. | |
| 6,531,824 B1 | * 3/2003 | Yan | ........... 315/58 |
| 6,552,491 B1 | 4/2003 | Bruning et al. | |

* cited by examiner

Primary Examiner—Haissa Philogene
(74) Attorney, Agent, or Firm—Mayer, Brown, Rowe & Maw LLP

(57) ABSTRACT

Disclosed is an electronic ballast for a fluorescent lamp having a high capacitance capable of turning on lamps of different capacitances (36W, 18W), or selectively two lamps of the same capacitance or one lamp, using one circuit, by replacing a lamp driving unit with an integrated circuit (IC). The electronic ballast comprises a power separator for separating a DC power into a lamp power and a circuit driving power, a constant-voltage unit for making the circuit driving power a constant voltage, a switching signal generator that is driven by the power supplied from the constant-voltage unit, for generating a pulse width modulation (PWM) signal corresponding to a capacitance of a lamp connected thereto to lamps having different capacitance or a plurality of lamps, a first transformer for inducing the signal outputted from the switching signal generator to the secondary side, first and second field effect transistors for performing a switching operation corresponding to the output signal from the secondary side of the first transformer in order to generate a high voltage for turning on a fluorescent lamp, and a plurality of bulb for turning on the lamp (CF lamp) using the high voltage generated by the second and third transformers.

6 Claims, 5 Drawing Sheets

ELECTRONIC BALLAST FOR FLUORESCENT LAMP

BACKGROUND OF THE INVENTION

1. Field of the Invention

The present invention relates to an electronic ballast for an fluorescent lamp (CF lamp), and more particularly, to an electronic ballast for an fluorescent lamp capable of turning on lamps of different capacitances (36W, 18W, etc.), or selectively turning on two lamps of the same capacitance or one lamp, using one circuit, by replacing a conventional lamp driving circuit with an integrated circuit (IC).

2. Background of the Related Art

In general, lighting fixtures that emit light such as an incandescent light, a fluorescent lamp, and the like are attached to given locations (in particular, ceiling) in an office, homes, buildings, and the like, in order to make light surrounding environments when it gets dark. Those lighting fixtures are replaced with new ones after their power are run out.

The fluorescent lamp of these lighting fixtures might be classified largely into a transformer mode and a ballast mode.

A compact fluorescent lamp (CFL) that has been widely used has a ballast element and a screw element on the top of the lamp. It can be thus easily used as a socket for a common incandescent light.

The lamp socket of a socket type for use in the incandescent light, the fluorescent lamp, etc. has been widely used for interior illumination in common homes, offices, etc. or inner illumination within refrigerators, microwave ovens, etc.

FIG. 1 is a circuit diagram of conventional electronic ballast for 220V.

As shown in FIG. 1, the electronic ballast includes the power supply 101; a power supply unit 110 having a fuse F that is short-circuited in order to prevent in advance damage of the circuit due to a high voltage when the voltage of the power supply 101 exceeds a predetermined voltage, a varistor B1 connected between both supply ends of the power supply 101 for stabilizing the AC power, a filter 111 for removing noise from the power, and a plurality of condensers C2~C4 for voltage stabilization; a direct-current (DC) transformation unit 200 having a bridge diode BD, an inductance L2 and a smoothing condenser C5, for rectifying the AC (alternating current) power (220V) supplied from the power supply unit 110 into a DC power; and a lamp driving unit 300 that oscillates according to the power supplied from the DC transformation unit 200 to turn on the lamp.

In the above, the lamp driving unit 300 includes power transistors Q1 and Q2 connected to the bridge diode BD and the smoothing condenser C5 of the DC transformation unit 200, for performing a switching operation in order to generate an oscillation voltage for turning on the fluorescent lamp, oscillation coils L1, L2 and L3 connected to the power transistors Q1 and Q2, for generating a frequency of 25 Khz~30 Khz depending on the values of the coils, a bulb BULB connected to the oscillation coils L1, L2 and L3, for turning on the fluorescent lamp using a voltage of a high frequency, diodes D10 and D11 and condensers C10 and C11, which are connected between the oscillation coil L3 and the bulb BULB, for offsetting a surge voltage generating when the lamp is connected to the socket in order to protect the lamp and the socket, a plurality of diodes D5~D9 for protecting the power transistors Q1 and Q2, and a triac TA1 for preventing line surge applied to the base of the power transistor Q2.

One exemplary operation of the fluorescent lamp for the electronic ballast constructed above will be below described.

AC 220V of the power supply 101 is inputted to the power supply unit 110. In the power supply unit 110, the filter 111 filters the AC power through the fuse F to remove line noise from it. Next, the plurality of the condensers C2~C4 stabilize the AC power and then transmit the resulting AC power to the DC transformation unit 200.

In the DC transformation unit 200, the bridge diode BD full-wave rectifies the inputted AC power. Next, the smoothing condenser C5 makes smooth the AC power and then converts it into a DC power. Thereafter, the DC power is transferred to the lamp driving unit 300 through the inductance L2.

In the lamp driving unit 300, the power transistors Q1 and Q2 are repeatedly turned on and turned off according to the DC power. Accordingly, high-frequency oscillation occurs through the oscillation coils L1, L2 and L3, which then turns on the lamp.

In other words, the voltage that was rectified as the DC power in the DC transformation unit 200 is applied to the power transistors Q1 and Q2 via the resistor R11, the diode D5, the condenser C7 and the triac TA1. Also, the power transistors Q1 and Q2 are alternately operated according to the DC power.

In particular, the power transistors Q1 and Q2 oscillate in a frequency of 25 Khz~30 Khz depending on the values of the oscillation coils L1, L2 and L3 connected to the bases of the power transistors Q1 and Q2. This oscillation voltage results in supplying an instantly high voltage through the CT coil and the condenser C9 of the bulb BULB, to both ends of the lamp. Therefore, the lamp is turned on while a gas within the lamp is ionized.

Further, the diodes D10 and D11 and the condensers C10 and C11, which are connected between the oscillation coil L3 and the bulb BULB, offset the surge voltage occurring when the lamp is connected to the socket, whereby flickering of the lamp is removed.

FIG. 2 is a circuit diagram of a conventional electronic ballast for 120V.

As shown in FIG. 2, the electronic ballast includes the power supply 601; a power supply unit 610 having a fuse F that is short-circuited in order to prevent in advance damage of the circuit due to a high voltage when the voltage of the power supply 601 exceeds a predetermined voltage, a varistor B1 connected between both supply ends of the power supply 601 for stabilizing an AC power, a filter 611 for removing noise from the power, and a plurality of condensers C1~C3 for voltage stabilization; a DC transformation and boosting unit 700 having diodes D12 and D13 and condensers C13 and C14 for rectifying the AC power (120V) supplied from the power supply unit 610 to be a DC power and then boosting it twice; and a lamp driving unit 300 that oscillates according to the power supplied from the DC transformation and boosting unit 700 to turn on the lamp.

In the above, the lamp driving unit 300 includes power transistors Q1 and Q2 connected to the DC transformation and boosting unit 700, for performing a switching operation in order to generate an oscillation voltage for turning on the fluorescent lamp, oscillation coils L1, L2 and L3 connected to the power transistors Q1 and Q2, for generating a frequency of 25 Khz~30 Khz depending on the values of the coils, a bulb BULB connected to the oscillation coils L1, L2 and L3, for using a voltage of a high frequency to turn on the fluorescent lamp, diodes D10 and D11 and condensers C10 and C11, which are connected between the oscillation coil L3 and the bulb BULB, for offsetting a surge voltage occurring when the lamp is connected to the socket in order to protect the lamp and the socket, a plurality of diodes D5~D9 for protecting the power transistors Q1 and Q2, and a triac TA1 for preventing line surge applied to the base of the power transistor Q2.

Another exemplary operation of the fluorescent lamp for the electronic ballast constructed above will be below described.

AC 120V of the power supply 601 is inputted to the power supply unit 610. In the power supply unit 610, the filter 611 filters the AC power through the fuse F to remove line noise from the AC power. Next, the plurality of the condensers C1~C3 stabilize the AC power and then transmit the stabilized AC power to the DC transformation and boosting unit 700.

In the DC transformation and boosting unit 700, the diodes D12 and D13 rectify the AC power to be a DC power. Next, the condensers C13 and C14 boost the DC power twice and then transfer it to the lamp driving unit 300.

In the lamp driving unit 300, the power transistors Q1 and Q2 are repeatedly turned on and turned off according to the DC power. Accordingly, high-frequency oscillation occurs through the oscillation coils L1, L2 and L3, which then turn on the lamp.

In other words, the DC power that was boosted to the DC power twice in the DC transformation and boosting unit 700 is transferred to the power transistors Q1 and Q2 via the resistor R11, the diode D5, the condenser C7 and the triac TA1. Also, the power transistors Q1 and Q2 are alternately operated according to the DC power.

In particular, the power transistors Q1 and Q2 oscillate in a frequency of 25 Khz~30 Khz depending on the values of the oscillation coils L1, L2 and L3 connected to the bases of the power transistors Q1 and Q2. This oscillation voltage results in supplying an instantly high voltage through the coil CT and the condenser C9 of the bulb BULB, to both ends of the lamp. Therefore, the lamp is turned on while a gas within the lamp is ionized.

Further, the diodes D10 and D11 and the condensers C10 and C11, which are connected between the oscillation coil L3 and the bulb BULB, offset the surge voltage occurring when the lamp is connected to the socket, whereby flickering of the lamp is removed.

This conventional electronic ballast, however, employs the power supply of the circuit that oscillates at high frequency to drive the lamp and the lamp power supply for turning on the lamp, as single power supply. Due to this, the conventional electronic ballast has disadvantages that the power factor is low and the overall operation of the circuit is unstable due to interference, etc.

Further, the conventional electronic ballast circuit is implemented using an analog circuit in which the lamp driving unit has a fixed value. Due to this, there is a problem that only one lamp corresponding to a corresponding capacitance could be driven but a plurality of lamps having different capacitances could not be driven.

Also, as described above, the conventional electronic ballast circuit is implemented using the analog circuit having a fixed value. Due to this, there is a disadvantage that when lamps having different capacitances are to be turned on, the circuit has to be modified accordingly.

SUMMARY OF THE INVENTION

Accordingly, the present invention is directed to substantially obviate one or more problems due to limitations and disadvantages of the related art.

An object of the present invention is to provide an electronic ballast for a fluorescent lamp capable of turning on lamps of different capacitances (36W, 18W, etc.), or selectively turning on two lamps of the same capacitance or one lamp, by replacing a conventional lamp driving circuit with an integrated circuit (IC).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an electronic ballast for a fluorescent lamp having a power supply, a power supply unit, a DC transformation unit and a lamp driving unit is characterized in that the lamp driving unit comprises:

a power separator for separating a DC power supplied from the DC transformation unit into a lamp power and a circuit driving power;

a constant-voltage unit for making the circuit driving power supplied from the power separator a constant voltage;

a switching signal generator that is driven by the power supplied from the constant-voltage unit, for generating a pulse width modulation (PWM) signal corresponding to a capacitance of a lamp connected thereto to drive lamps having different capacitances or a plurality of lamps;

a first transformer for inducing the signal outputted from the switching signal generator to a secondary side;

first and second field effect transistors for performing a switching operation corresponding to the output signal from the secondary side of the first transformer, in order to generate a high voltage for turning on the fluorescent lamp;

second and third transformers for generating a high voltage corresponding to the switching operation of the first and second field effect transistors; and a plurality of bulbs for turning on the lamp (CF lamp) using the high voltage generated by the second and third transformers.

In another aspect of the present invention, an electronic ballast for a fluorescent lamp having a power supply, a power supply unit and a DC transformation unit is characterized in that it comprises:

a DC power boosting unit for boosting a power supplied from the DC transformation unit; and a lamp driving unit for selectively turning on a plurality of lamps (fluorescent lamps) using the voltage outputted from the DC power boosting unit.

In the above, the DC power boosting unit comprises:

a constant-voltage unit for making the DC power supplied from the DC transformation unit a constant voltage;

a step-up controller that is driven by the power supplied from the constant-voltage unit to generate a switching signal for DC power step-up;

a field effect transistor for performing a switching operation corresponding to the switching signal outputted from the step-up controller; and a step-up transformer for boosting the DC power outputted from the DC transformation unit corresponding to the operation of the field effect transistor.

In the above, the lamp driving unit comprises:

a constant-voltage unit for making the DC power supplied through an anti-backward current diode a constant voltage;

a switching signal generator that is driven by the power supplied from the constant-voltage unit, for generating a pulse width modulation (PWM) signal corresponding to a capacitance of a lamp connected thereto to drive lamps having different capacitances or a plurality of lamps;

a first transformer for inducing the signal outputted from the switching signal generator to a secondary side;

first and second field effect transistors for performing a switching operation corresponding to the output signal from the secondary side of the first transformer in order to generate a high voltage for turning on the fluorescent lamp;

second and third transformers for generating a high voltage corresponding to the switching operation of the first and second field effect transistors; and a plurality of bulb for turning on the lamp (CF lamp) using the high voltage generated by the second and third transformers.

It is to be understood that both the foregoing general description and the following detailed description of the present invention are exemplary and explanatory and are intended to provide further explanation of the invention as claimed.

BRIEF DESCRIPTION OF THE DRAWINGS

Further objects and advantages of the invention can be more fully understood from the following detailed description taken in conjunction with the accompanying drawings in which.

DETAILED DESCRIPTION OF THE PREFERRED EMBODIMENT

Figure 1:
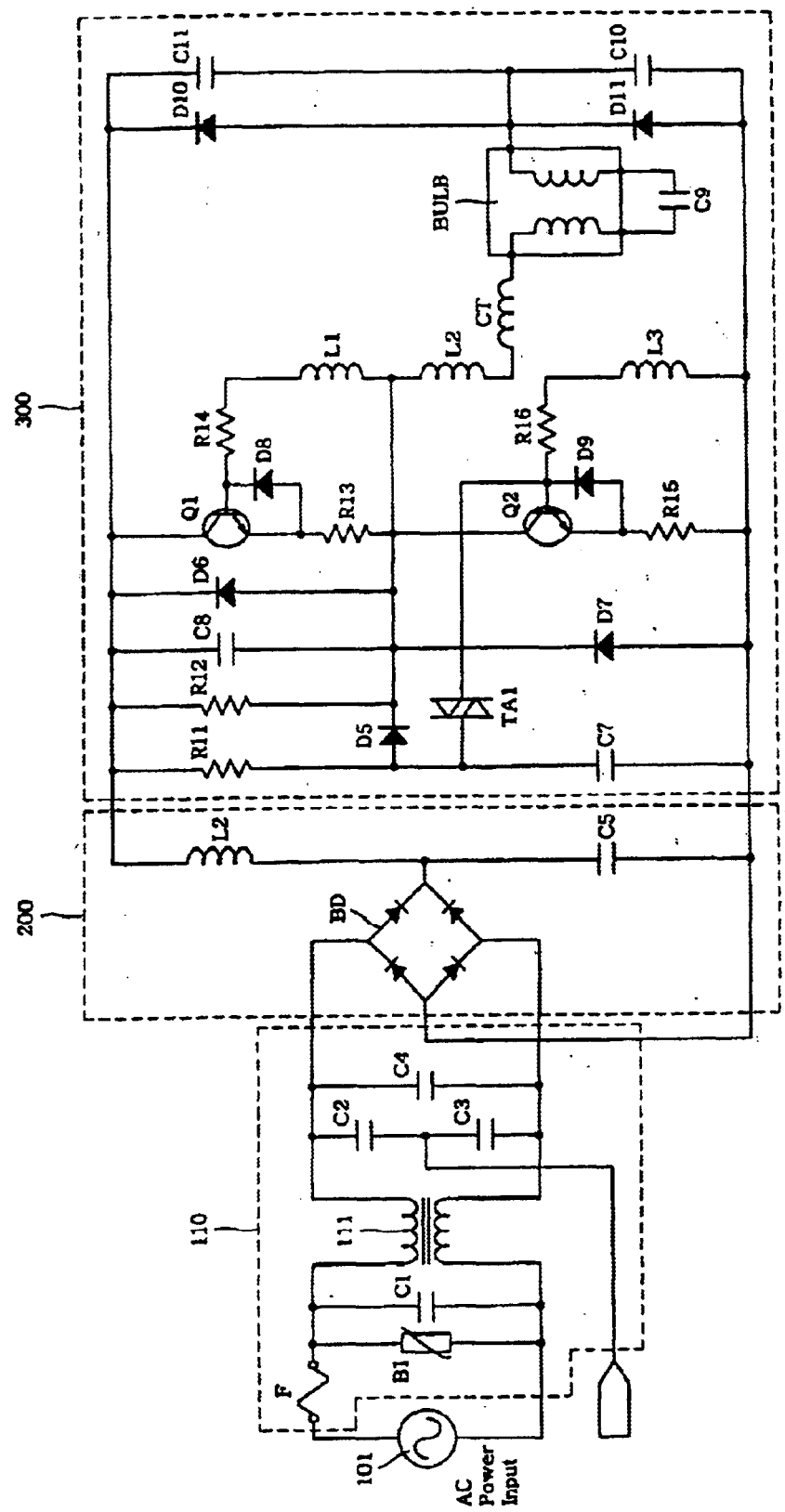
FIG. 1 is a circuit diagram of a conventional electronic ballast for 220V.
Figure 2:
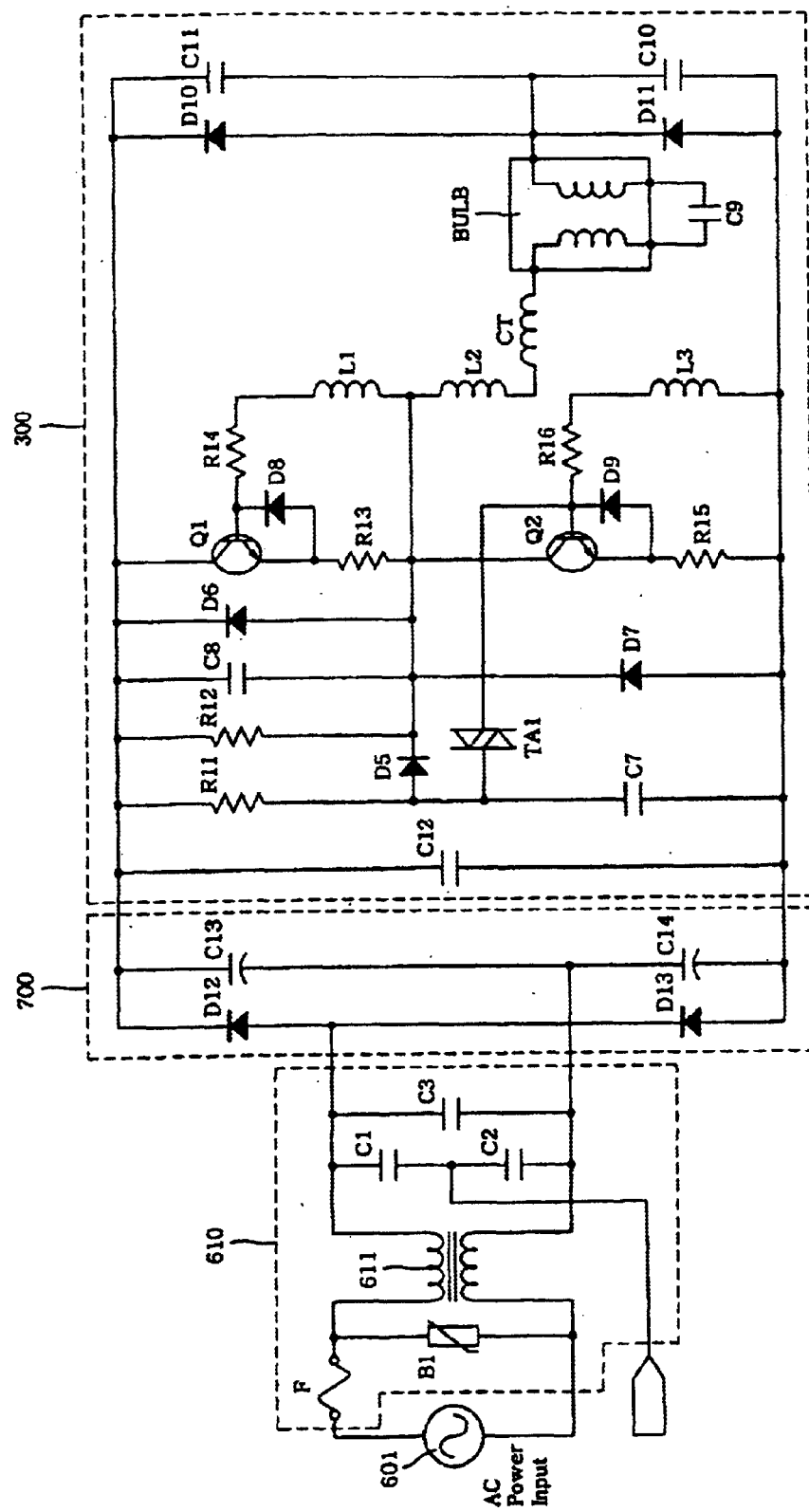
FIG. 2 is a circuit diagram of a conventional electronic ballast for 120V.

The present invention will now be described in detail in connection with preferred embodiments with reference to the accompanying drawings. For reference, like reference characters designate corresponding parts throughout several views.

Figure 3:
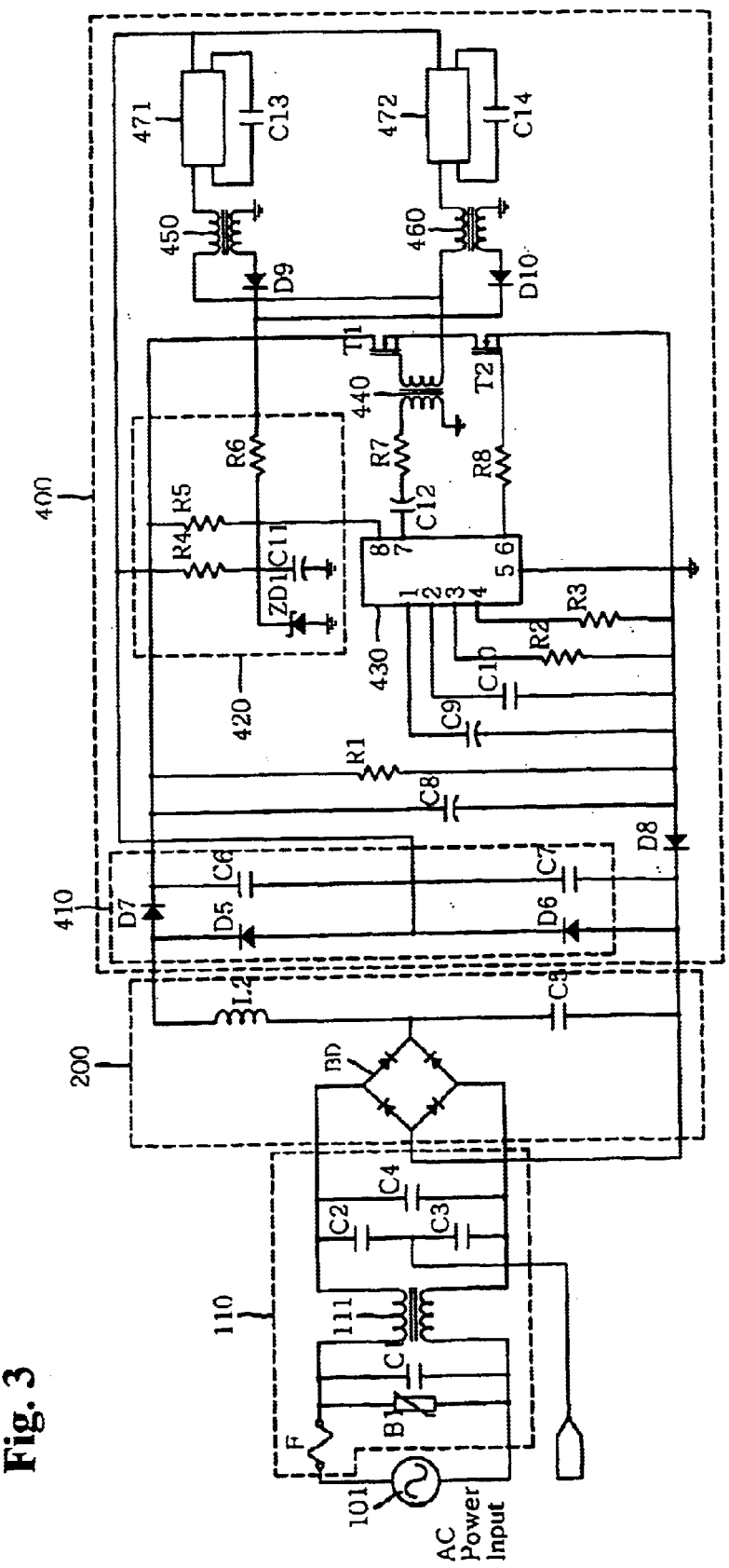
FIG. 3 is a circuit diagram of an electronic ballast for 220V according to a preferred embodiment of the present invention.

FIG. 3 is a circuit diagram of an electronic ballast for 220V according to a preferred embodiment of the present invention.

As shown in FIG. 3, the electronic ballast comprises the power supply 101; a power supply unit 110 having a fuse F that is short-circuited in order to prevent in advance damage of the circuit due to a high voltage when the voltage of the power supply 101 exceeds a predetermined voltage, a varistor B1 connected between both supply ends of the power supply 101 for stabilizing AC power, a filter 111 for removing noise from the power, and a plurality of condensers C2~C4 for voltage stabilization; a direct-current (DC) transformation unit 200 having a bridge diode BD, an inductance L2 and a smoothing condenser C5, for rectifying the AC power (220V) supplied from the power supply unit 110 to be a DC power; and a lamp driving unit 400 that oscillates according to the power supplied from the DC transformation unit 200 to turn on the lamp.

The lamp driving unit 400 comprises a power separator 410 for separating the DC power supplied from the DC transformation unit 200 into a lamp power and a circuit driving power; a constant-voltage unit 420 for making the circuit driving power supplied from the power separator 410 a constant voltage; a switching signal generator 430 that is driven by the power supplied from the constant-voltage unit 420, for generating a pulse width modulation (PWM) signal corresponding to a capacitance of a lamp connected thereto to drive lamps having different capacitances or a plurality of lamps; a first transformer 440 for inducing the signal outputted from the switching signal generator 430 to the secondary side; first and second field effect transistors T1 and T2 for performing a switching operation corresponding to the output signal from the secondary side of the first transformer 440 in order to generate a high voltage for turning on the fluorescent lamp; second and third transformers 450 and 460 for generating a high voltage corresponding to the switching operation of the first and second field effect transistors T1 and T2; and a plurality of bulbs 471 and 472 for turning on the lamp (CF lamp) using the high voltage generated by the second and third transformers 450 and 460.

In FIG. 3, unexplained reference numerals R1~R8 indicate resistors and C8~C14 indicate condensers.

An operation of the electronic ballast for the fluorescent lamp for 220V will be below described.

First, AC 220V of the power supply 101 is inputted to the power supply unit 110. In the power supply unit 110, the filter 111 filters the AC power through the fuse F to remove line noise from the AC power. Next, the plurality of condensers C2~C4 stabilize the AC power and then transfer the stabilized AC power to the DC transformation unit 200.

In the DC transformation unit 200, the bridge diode BD full-wave rectifies the AC power inputted from the power supply unit 110. Next, the smoothing condenser C5 makes the AC power smooth. Thereafter, the AC power is transformed into a DC power, which is then transferred to the lamp driving unit 400 through the inductance L2.

In the lamp driving unit 400, the diodes D5~D7 and the condensers C6 and C7 in the power separator 410 separate the power into a lamp power and a circuit driving power so that a high power factor can be implemented.

Next, in the constant-voltage unit 420 in the lamp driving unit 400, the Zener diode ZD1 makes the circuit driving power supplied from the power separator 410 a constant voltage. The condenser C11 then charges and discharges the circuit driving power. At this time, voltage-divide resistors R5 and R6 divide the discharge voltage and then apply it to the switching signal generator 430.

The switching signal generator 430 is driven by the applied voltage and thus generates a pulse width modulation (PWM) signal corresponding to the capacitance (36W*2 or 18W*2) of a lamp (CF lamp) connected thereto, thus generating a signal for driving lamps having different capacitances or a plurality of lamps. In other words, the switching signal generator 430 generates a lamp switching signal of 36W and a lamp switching signal of 18W by changing only the pulse width modulation (PWM) signal.

The switching signal generated thus is induced to the secondary side of the first transformer 440 via the condenser C12 and the resistor R7, and then alternately transferred to the first and second field effect transistors T1 and T2.

The first and second field effect transistors T1 and T2 perform a switching operation corresponding to the output signal from the secondary side of the first transformer 440 in order to generate a high voltage for turning on the fluorescent lamp. At this time, the two field effect transistors T1 and T2 are alternately turned on and off. In other words, if the field effect transistor T1 at one side is turned on, the field effect transistor T2 at the other side is turned off. On the contrary, if the field effect transistor T1 at one side is turned off, the field effect transistor T2 at the other side is turned on.

In accordance with this switching operation, the second and third transformers 450 and 460 alternately operated to selectively transfer the high voltage to the bulbs 471 and 472.

Then, the bulbs 471 and 472 turns on the lamp (CF lamp) using the high voltage.

In other words, in the prior art, one stabilizer turns on one fluorescent lamp only. In the present invention, however, one stabilizer can selectively turn on a plurality of lamps having the same capacitance (i.e., one lamp is turned on or plural lamps are turned on at the same time). Further, in the present invention, one stabilizer can turn on plural lamps having different capacitances (for example 36W, 18W, etc.) by changing only the pulse width modulation (PWM) signal without changing the circuit.

Figure 4:
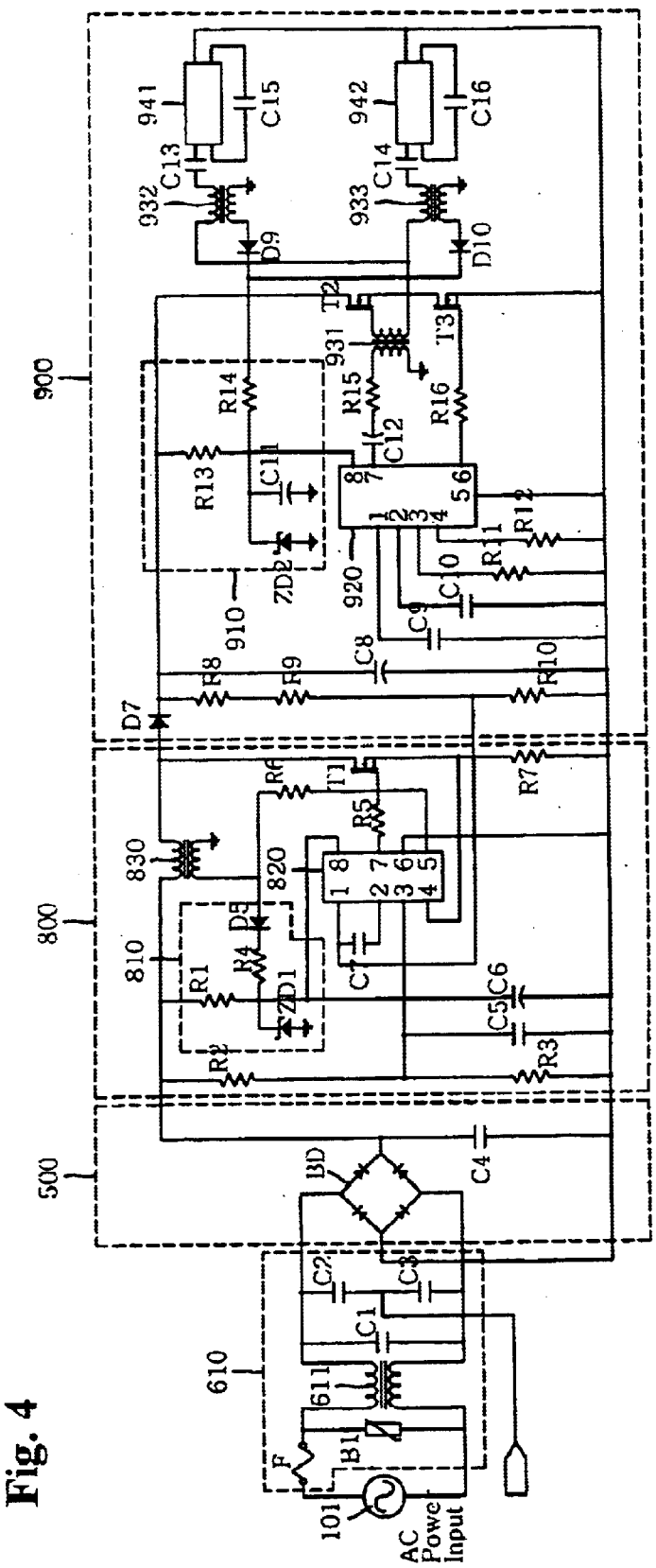
FIG. 4 is a circuit diagram of an electronic ballast for 120V according to a preferred embodiment of the present invention.

FIG. 4 is a circuit diagram of an electronic ballast for 120V according to a preferred embodiment of the present invention.

As shown in FIG. 4, the electronic ballast comprises a power supply 101; a power supply unit 610 having a fuse F that is short-circuited in order to prevent in advance damage of the circuit due to a high voltage when the voltage of the power supply 101 exceeds a predetermined voltage, a varistor B1 connected between both supply ends of the power supply 101 for stabilizing the AC power, a filter 611 for removing noise from the power, and a plurality of condensers C1~C3 for voltage stabilization; a DC transformation unit 500 for rectifying the AC power (120V) supplied from the power supply unit 610 to be a DC power and then making smooth the DC power; a DC power boosting unit 800 for boosting the voltage supplied from the DC transformation unit 500; and a lamp driving unit 900 for selectively turning on a plurality of lamps (CF lamps) using the power outputted from the DC power boosting unit 800.

In the above, the DC power boosting unit 800 comprises a constant-voltage unit 810 for making the DC power supplied from the DC transformation unit 500 a constant, a step-up controller 820 that is driven by the power supplied from the constant-voltage unit 810 to generate a switching signal for boosting the DC power, a field effect transistor T1 for performing a switching operation corresponding to the switching signal outputted from the step-up controller 820, and a step-up transformer 830 for boosting the DC power outputted from the DC transformation unit 500 corresponding to the operation of the field effect transistor T1.

In the above, the lamp driving unit 900 comprises a constant-voltage unit 910 for making the DC power supplied through an anti-backward current diode D7 a constant voltage, a switching signal generator 920 that is driven by the power supplied from the constant-voltage unit 910, for generating a pulse width modulation (PWM) signal corresponding to a capacitance of a lamp connected thereto to drive lamps having different capacitances or a plurality of lamps, a first transformer 931 for inducing the signal outputted from the switching signal generator 920 to the secondary side, first and second field effect transistors T2 and T3 for performing a switching operation corresponding to the output signal from the secondary side of the first transformer 931 in order to generate a high voltage for turning on the fluorescent lamp, second and third transformers 932 and 933 for generating a high voltage corresponding to the switching operation of the first and second field effect transistors T2 and T3, and a plurality of bulb 941 and 942 for turning on the lamp (CF lamp) using the high voltage generated by the second and third transformers 932 and 933.

An operation of the compact electronic ballast for the compact fluorescent lamp for 120V according to the present invention will be below described.

First, AC 120V of the power supply 101 is inputted to the power supply unit 610. In the power supply unit 610, the filter 611 filters the AC POWER through the fuse F to remove line noise from the AC power. Next, the plurality of the condensers C1~C3 stabilize the AC power and then transmit the stabilized to the DC transformation unit 500.

In the DC transformation unit 500, the bridge diode BD full-wave rectifies the inputted AC power. The smoothing condenser C4 then makes smooth the AC power and converts it a DC power and then transmits the DC power to the DC power boosting unit 800.

In the DC power boosting unit 800, the voltage-divide resistors R1 and R4 in the constant-voltage unit 810 separate the DC power supplied from the DC transformation unit 500. Next, the Zener diode ZD1 makes the DC power a constant voltage and then transmits it to the step-up controller 820.

The step-up controller 820 is driven by the power supplied from the constant-voltage unit 810 and also generates a switching signal for boosting the DC power. The field effect transistor T1 performs a switching operation corresponding to the switching signal generated from the step-up controller 820

The step-up transformer 830 steps up the DC power outputted from the DC transformation unit 500 corresponding to the operation of the field effect transistor T1, and then outputs the boosted DC power to the lamp driving unit 900.

In the constant-voltage unit 910 in the lamp driving unit 900, the Zener diode ZD2 makes the DC power supplied from the DC power boosting unit 800 a constant voltage. The condenser C11 then charges and discharges the constant voltage. At this time, the voltage-divide resistors R13 and R14 separate the discharge voltage and then apply it to the switching signal generator 920.

The switching signal generator 920 is driven by the applied voltage and thus generates the pulse width modulation (PWM) signal corresponding to the capacitances (36W*2 or 18W*2) of the lamp (CF lamp), thereby generating a signal for driving lamps having different capacitances or a plurality of lamps. In other words, the switching signal generator 920 can generate a lamp switching signal of 36W and a lamp switching signal of 18W, by changing only the pulse width modulation (PWM) signal.

The switching signal generated thus is induced to the secondary side of the first transformer 931 via the condenser C12 and the resistor R15, and then is alternately transferred to the first and second field effect transistors T2 and T3.

The first and second field effect transistors T2 and T3 perform a switching operation corresponding to the output signal from the secondary side of the first transformer 931 in order to generate a high voltage for turning on the fluorescent lamp. At this time, the two field effect transistors T2 and T3 are alternately turned on and off. In other words, if the field effect transistor T2 at one side is turned on, the field effect transistor T3 at the other side is turned off. On the contrary, if the field effect transistor T2 at one side is turned off, the field effect transistor T3 at the other side is turned on.

In accordance with this switching operation, the second and third transformers 932 and 933 are alternately driven to selectively transfer the high voltage to the bulbs 941 and 942 connected thereto.

Then, the bulbs 941 and 942 use the applied high voltage to turn on the lamp (CF lamp).

In other words, in the prior art, one stabilizer turns on only one fluorescent lamp. In the present invention, however, one stabilizer can selectively turn on a plurality of lamps having the same capacitance (i.e., one lamp is turned on, or plural lamps are turned on at the same time). Further, in the present invention, one stabilizer can turn on plural lamps having different capacitances (for example 36W, 18W, etc.), by changing only the pulse width modulation signal without changing the circuit.

Figure 5:
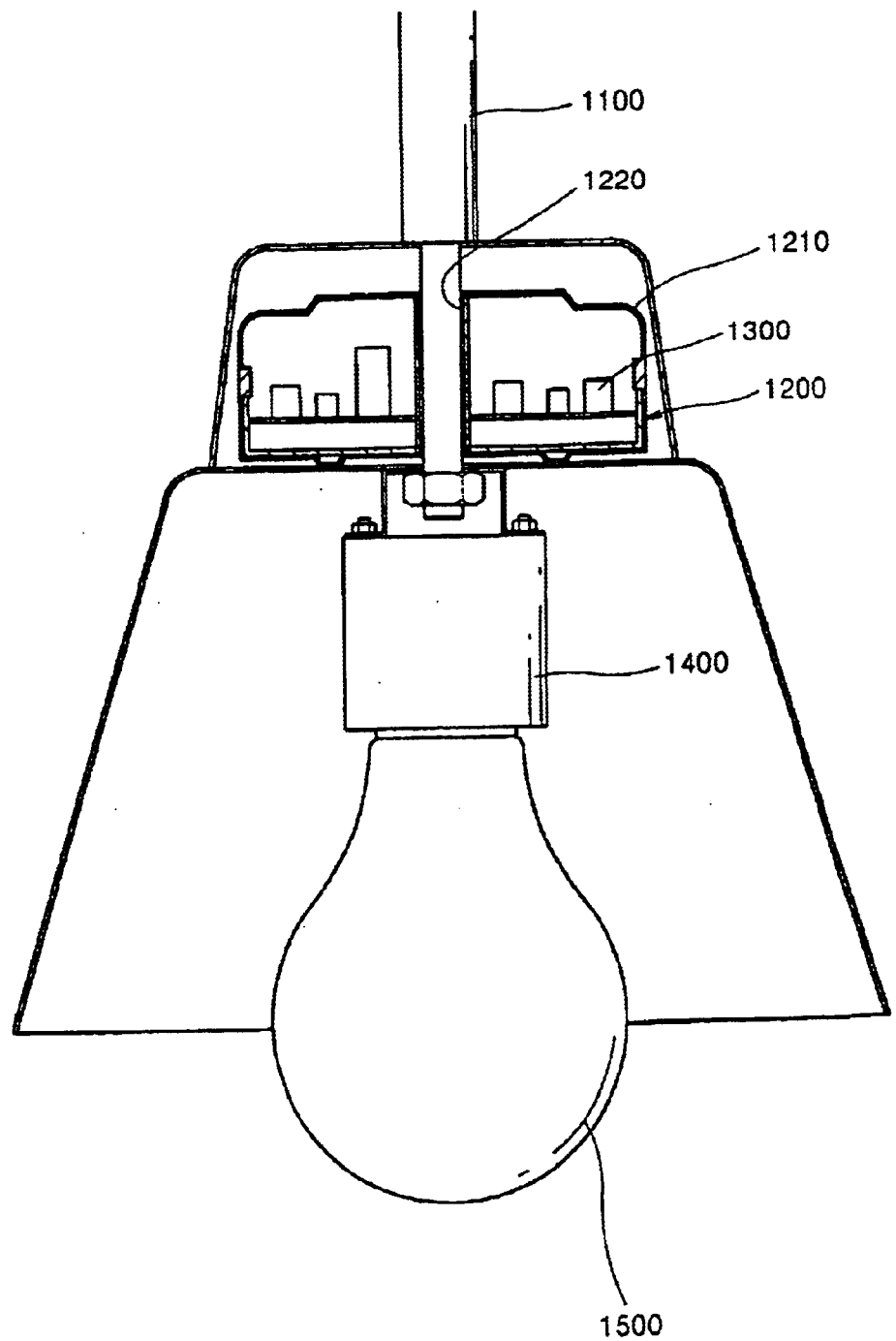
FIG. 5 illustrates a state that the electronic ballast according to the present invention is installed.

FIG. 5 illustrates a state that the electronic ballast according to the present invention is installed.

In FIG. 5, a reference numeral '1100' indicates a tube for connecting a lighting fixture, in which the power supply line is included, a reference numeral '1200' indicates ballasts, a reference numeral '1300' indicates a printed circuit board (PCB), a reference numeral '1400' indicates a socket and a reference numeral '1500' indicates a lamp. Further, a reference numeral '1210' indicates a case having a hole 1220 through which the tube 1100 is easily coupled at the center of the case 1210.

As such, if the hole 1220 is formed at the center of the case 1210, it facilitates coupling with the tube 1100 when the lighting fixture is installed.

Therefore, the present invention has a new effect that it can provide an electronic ballast for a fluorescent lamp having a high power factor by separating the lamp power and the circuit power.

Further, the present invention has an advantageous effect that it can selectively turn on a plurality of lamps having the same capacitance using single electronic ballast circuit.

Also, the present invention has an outstanding effect that it can selectively turn on a plurality of lamps having different capacitances using single electronic ballast circuit.

In addition, the present invention has a new effect that it can easily implement the circuit by replacing a conventional complicated analog circuit with an integrated circuit.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed are:

1. An electronic ballast for a fluorescent lamp having a power supply, a power supply unit, a DC transformation unit and a lamp driving unit, being characterized in that:

the lamp driving unit comprises:

a power separator for separating a DC power supplied from the DC transformation unit into a lamp power and a circuit driving power;

a constant-voltage unit for making the circuit driving power supplied from the power separator a constant voltage;

a switching signal generator that is driven by the power supplied from the constant-voltage unit, for generating a pulse width modulation (PWM) signal corresponding to a capacitance of a lamp connected thereto to drive lamps having different capacitances or a plurality of lamps;

a first transformer for inducing the signal outputted from the switching signal generator to a secondary side;

first and second field effect transistors T1 and T2 for performing a switching operation corresponding to the output signal from the secondary side of the first transformer, in order to generate a high voltage for turning on the fluorescent lamp;

second and third transformers for generating a high voltage corresponding to the switching operation of the first and second field effect transistors T1 and T2; and a plurality of bulbs for turning on the lamp (CF lamp) using the high voltage generated by the second and third transformers.

2. The electronic ballast claimed in claim 1, wherein the electronic ballast is surrounded and protected by a case having a hole through which a lighting fixture is coupled at the center of the case.

3. An electronic ballast for a fluorescent lamp having a power supply, a power supply unit and a DC transformation unit, comprising:

a DC power boosting unit for boosting a power supplied from the DC transformation unit; and a lamp driving unit for selectively turning on a plurality of lamps (fluorescent lamps) using the voltage outputted from the DC power boosting unit, wherein the DC power boosting unit comprises:

a constant-voltage unit for making the DC power supplied from the DC transformation unit a constant voltage;

a step-up controller that is driven by the power supplied from the constant-voltage unit to generate a switching signal for DC power step-up;

a field effect transistor T1 for performing a switching operation corresponding to the switching signal outputted from the step-up controller; and a step-up transformer for boosting the DC power outputted from the DC transformation unit corresponding to the operation of the field effect transistor T1.

4. The electronic ballast claimed in claim 3, wherein the electronic ballast is surrounded and protected by a case having a hole through which a lighting fixture is coupled at the center of the case.

5. An electronic ballast for a fluorescent lamp having a power supply, a power supply unit and a DC transformation unit, comprising:

a DC power boosting unit for boosting a power supplied from the DC transformation unit; and a lamp driving unit for selectively turning on a plurality of lamps (fluorescent lamps) using the voltage outputted from the DC power boosting unit, wherein the lamp driving unit comprises:

a constant-voltage unit for making the DC power supplied through an anti-backward current diode D7 a constant voltage;

a switching signal generator that is driven by the power supplied from the constant-voltage unit, for generating a pulse width modulation (PWM) signal corresponding to a capacitance of a lamp connected thereto to drive lamps having different capacitances or a plurality of lamps;

a first transformer for inducing the signal outputted from the switching signal generator to a secondary side;

first and second field effect transistors T2 and T3 for performing a switching operation corresponding to the output signal from the secondary side of the first transformer in order to generate a high voltage for turning on the fluorescent lamp;

second and third transformers for generating a high voltage corresponding to the switching operation of the first and second field effect transistors T2 and T3; and a plurality of bulbs for turning on the lamp (CF lamp) using the high voltage generated by the second and third transformers.

6. The electronic ballast claimed in claim 5, wherein the electronic ballast is surrounded and protected by a case having a hole through which a lighting fixture is coupled at the center of the case.

* * * * *